Jan. 2, 1968 R. P. MASSEY 3,361,992

TRAVELING WAVE TUBE MODULATOR CIRCUIT

Filed Nov. 25, 1964

INVENTOR
R. P. MASSEY
BY Walter M. Hill
ATTORNEY

United States Patent Office
3,361,992
Patented Jan. 2, 1968

3,361,992
TRAVELING WAVE TUBE MODULATOR CIRCUIT

Richard P. Massey, Westfield, N.J., assignor to Bell Telephone Laboratories, Incorporated, New York, N.Y., a corporation of New York Filed Nov. 25, 1964, Ser. No. 413,849
5 Claims. (Cl. 332—7)

ABSTRACT OF THE DISCLOSURE

A traveling wave tube modulator circuit in which the charged interelectrode capacitances of the tube start a ringing current when a modulating pulse closes a switch which connects them to a saturable transformer winding. The ringing current drives the modulator anode positive to turn the beam on. A second modulating pulse closes a second switch to start another ringing current to turn the beam off. In each case, the ringing current energy is promptly damped by automatically absorbing it in solid state device power sinks. Solid state switches are used throughout.

This invention relates to modulator circuits and more particularly to a modulator circuit especially adapted for modulating the beam of a traveling wave tube.

Traveling wave tubes have become increasingly important in the space transmission of digital information at a high rate of speed. Hard tube modulators have been used in the past for modulating traveling wave tubes and some of these prior art modulator circuits are described in G. N. Glasoe and J. V. Lebacqz, Pulse Generators, volume 5, Radiation Laboratory Series (1948) and in H. A. Reise "Hard Tube" Pulsers for Radar, Bell Laboratories Record, April 1956, pages 153–156. The useful life of hard tubes in the hard tube modulator is somewhat limited and applicant's copending application entitled, "Traveling Wave Tube Modulator Circuit," filed Feb. 25, 1964, Ser. No. 347,311, now Patent 3,259,855, granted July 5, 1966, describes a simplified solid state device circuit structure which materially extends the useful life of traveling wave tube modulators. However, the operating speed of the earlier invention has been found too slow for some applications. The present invention materially increases the operating speed by reason of employing a somewhat different principle involving high frequency ringing circuits.

It is an object of this invention to increase both the speed and the power handling capabilities of traveling wave tube modulators.

This invention achieves the foregoing object by a means involving the use of ringing circuits to rapidly control the beam of a traveling wave tube. The invention comprises one switch which connects the charged interelectrode capacitances of a traveling wave tube to one winding of a saturated transformer to start a high frequency ringing current which drives the modulating anode of the traveling wave tube positive thereby turning the beam on. The ringing current is thereafter immediately damped in a power sink, preferably comprising a solid state diode. A second switch connects a direct current source through another winding of the transformer to switch its core and generate a high voltage in the first winding which opens the first switch and starts a second high frequency ringing current between the first winding and the tube capacitances which results in driving the modulating anode negative to turn the beam off. This second ringing current is also immediately damped in a power sink.

Figure 1:
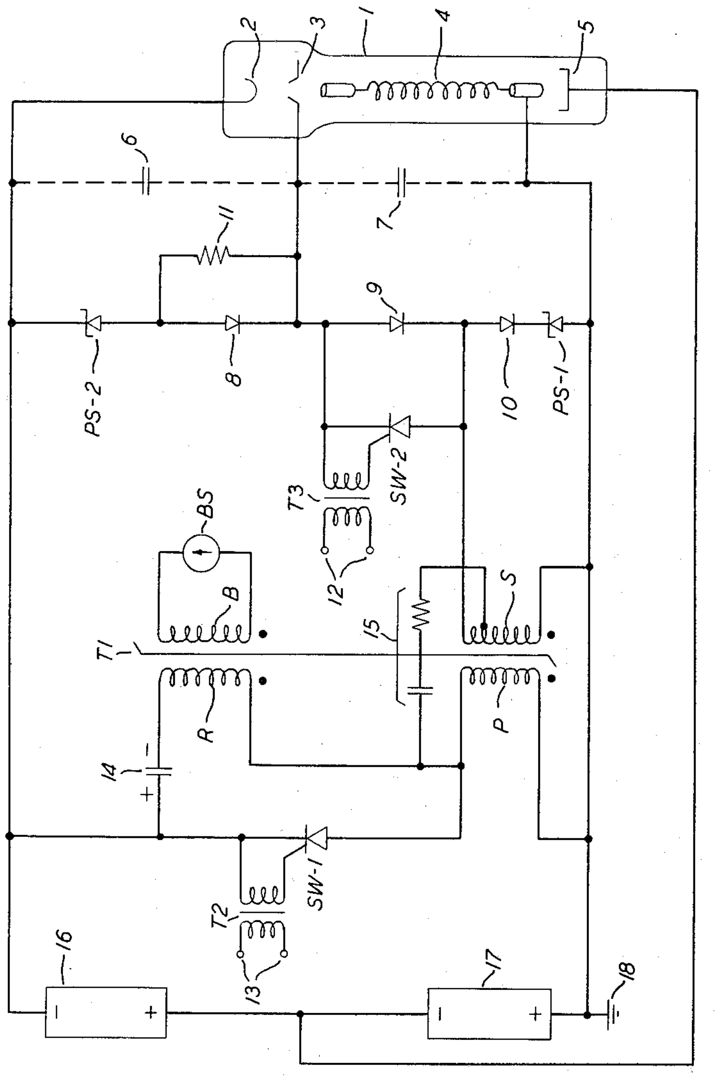
Figure 2:
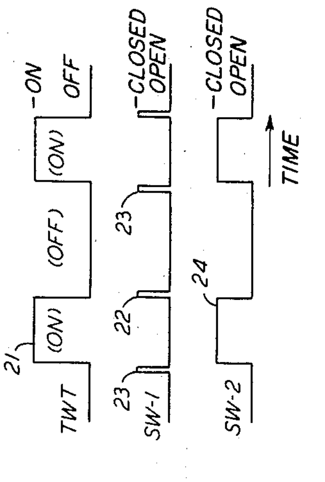

The invention may be better understood by reference to the accompanying drawings, in which:

FIG. 1 is a circuit diagram illustrating the essentials of a preferred embodiment of this invention; and FIG. 2 illustrates the relative operating sequence of the switches and the resulting on and off periods of the traveling wave tube beam.

FIG. 1 schematically shows a traveling wave tube 1 having a cathode 2, a modulating anode 3, a helix electrode 4 and a collector electrode 5. The well known radio frequency circuits are not shown as they are unnecessary to a complete understanding of this invention. The inherent interelectrode capacitance between the cathode and anode is represented by a capacitor 6 while the inherent interelectrode capacitance between the helix and the modulating anode is similarly represented by a capacitor 7. A power sink PS–2, preferably comprising a Zener diode and a simple high voltage diode 8 are shown connected in series between the cathode 2 and anode 3, diode 8 also being shunted by high resistance 11. Two diodes 9 and 10 and power sink PS–1, the latter also comprising a Zener diode, are connected serially between the modulating anode 3 and the helix electrode 4. Diode 9 is shunted by a PNPN switch SW–2, the anode of which is connected to the cathode of diode 9 and the cathode of which is connected to the anode of diode 9. A transformer T–3 has a pair of input terminals 12 connected to its primary winding while its secondary winding is connected to the control electrode of switch SW–2 and its cathode. As is well known, such a switch can be closed by applying a pulse of proper polarity to terminals 12 thereby initiating current flow in the switch which is thereafter maintained between its anode and cathode so long as sufficient current is supplied thereto. The polarities of the several diodes 8, 9 and 10 and those of the Zener diodes acting as power sinks PS–1 and PS–2 are illustrated in conventional manner in FIG. 1, i.e., the forward direction of current flow through diodes 8, 9 and 10 is from the upper electrode of diode 8 through the three diodes to the lower electrode of diode 10 so that the arrows represent their anodes.

A saturable transformer T–1 has a primary winding P, a secondary winding S, a bias winding B and a reset winding R. The secondary winding S is shown connected directly across the serially connected diode 10 and power sink PS–1. The bias winding B is connected to a current source BS which supplies a continuous constant current to this winding. The primary winding P is connected to the grounded positive side of direct current power source 17 and to the ungrounded negative side of power source 16 through a second PNPN switch SW–1. Sources 16 and 17 supply high direct voltages and are serially connected between the grounded helix electrode 4 and the cathode 2 of the traveling wave tube. A second control transformer T–2 with input terminals 13 is connected to switch SW–1 in a manner similar to that previously described for switch SW–2. The reset winding R is connected across switch SW–1 through a capacitor 14. A resistance and capacitor 15 are connected in series between the upper end of the primary winding and an intermediate connection on the secondary winding. The purpose of this series network is fully described in United States Patent 2,903,583 granted Sept. 8, 1959 to A. D. Hasley where this network is shown as capacitor 17 and resistor 18. The collector electrode 5 is connected directly to the junction between the two direct voltage sources 16 and 17, thereby maintaining this electrode positive with respect to cathode 2 but negative with respect to the helix electrode 4.

The tube beam is turned on by first momentarily applying a pulse to control terminals 13, thereby closing, switch SW–1. This prepares the circuit for turning the beam on by a subsequent operation of switch SW–2. A control pulse applied to control terminals 12 closes this switch. This sequence is schematically illustrated in FIG. 2 where the traveling wave tube beam is represented as being on at the rise of waveform 21 and off when the waveform lowers. Switch SW–1 is first operated, its closed condition being represented by the pulse 23. This prepares the circuit so that when switch SW–2 is closed as represented by the rise of waveform 24, the traveling wave tube beam is turned on. Subsequently closing switch SW–1, as represented by pulse 22, causes both the beam to turn off and switch SW–2 to open. An automatic reset feature, to be subsequently described, quickly reopens switch SW–1 each time after it is closed. Consequently, this circuit is operated by a pair of pulses. One pulse applied to terminals 12 turns the beam on and the other pulse applied to terminals 13 turns the beam off. The sequence of operation of the various circuit components will now be described in greater detail.

To start the sequence of operation, let it first be assumed that the interelectrode capacitances of the traveling wave tube are charged so that the modulating anode 3 is at a potential negative to both the grounded helix 4 and the cathode 2. By reason of the negative bias on the modulating anode, the traveling wave tube beam is held off. It should also be assumed under these initial conditions that both of the PNPN switches SW–1 and SW–2 are open and that the saturable transformer T–1 is in positive saturation so that its inductive impedances are small. Positive saturation is defined as the condition of the core produced by a saturating current flowing in at the dotted end of any of its windings.

With the initial conditions established as described above, switch SW–2 is closed by a pulse at terminals 12. This causes the traveling wave tube interelectrode capacitances 6 and 7 to discharge into the transformer secondary winding S and start an essentially undamped oscillation or ringing current. Since the modulating anode 3 was charged negative to ground, the first quarter cycle of oscillation will send a current through the secondary winding in a direction to drive the core more deeply into positive saturation. At the end of the first quarter cycle, the tube capacitances become discharged while the current in the winding is maximum so that the energy originally stored in the capacitances is now transferred to the transformer inductive field.

The current in the secondary winding begins to lower at the start of the second quarter cycle of ringing current, thus reversing the electromotive force induced therein so that the voltage begins to increase negative at its dotted or grounded end. During this part of the circuit operation the sum of the induced secondary winding potential and the potentials of sources 16 and 17 will make the modulating anode 3 positive with reference to the cathode and thereby turn the beam on. When the induced electromotive force reaches the breakdown potential of power sink PS–1, the effective resistance of the power sink is suddenly connected across the ringing circuit through diode 10. When this power sink breaks down it performs two functions. First, it clamps the voltage across the secondary winding at approximately the breakdown potential of the power sink and secondly, it acts to damp the oscillation by absorbing the energy from the transformer field. The induced electromotive force in the transformer gradually lowers toward the vicinity of the breakdown potential of the power sink but before the power sink can open, current through the bias winding B from the constant current bias source BS starts to gradually switch the transformer core to negative saturation thus maintaining the induced electromotive force in secondary winding S and holding it negative at its dotted end. Since the electromotive force induced in the transformer secondary (first by the dissipation of ringing current energy and then by the gradual switching action of the bias current) maintains the modulating anode positive with reference to the cathode, an anode current is supplied to the traveling wave tube so that its beam is continually held on throughout this sequence of operations. The beam can be turned off at any time thereafter by closing swtich SW–1 as previously described.

When switch SW–1 is closed, a strong current from power sources 16 and 17 passes through the primary winding P in such a direction as to override the magnetizing force of the bias current and rapidly switch the transformer back toward positive saturation. As this transformer switching operation begins, the ungrounded end of secondary winding S lowers from a positive potential toward a negative potential. As this potential reaches the breakdown potential of the power sink PS–1, the sink opens, promptly followed by the opening of diode 10 thereby leaving a charge on the tube capacitances with the modulating anode positive to the helix and cathode. Since these capacitances are now connected across the secondary winding of the saturated transformer through diode 9, this diode promptly closes and a second ringing oscillation begins as energy is transferred from the two capacitances to winding S of the now positively saturated transformer. The small voltage drop existing across diode 9 is in the reverse direction across switch SW–2 so that switch is promptly opened. At the end of the first quarter cycle of the ringing current, the oscillating electromotive force generated by this current in the secondary winding becomes positive at its grounded end. When this electromotive force exceeds the voltage of sources 16 and 17 by the breakdown potential of power sink PS–2, this power sink and its series connected diode 8 both close, thereby clamping the voltage between the modulating anode and the cathode at approximately the power sink breakdown voltage. This causes the modulating anode to be charged negatively with reference to both the helix and the cathode so that the traveling wave tube beam is cut off. The resistance of power sink PS–2 absorbs the ringing current energy to strongly damp the oscillation so that as the electromotive force generated in the secondary winding lowers below the sum of the voltages of sources 16 and 17 and the breakdown potential of power sink PS–2, this sink and diodes 8 and 9 are all caused to open, thereby trapping a negative charge on the modulating anode. The initial state is now momentarily restored except for switch SW–1 which is still conducting.

Switch SW–1 may be opened to reset the circuit by various methods already described in the literature and reference may be made to T. G. Wilson, R. W. Sterling and E. T. Moore, A Self-Oscillating Inverter Using a Saturable Two-Core Transformer To Turn Off Silicon-Controlled Rectifiers, A.I.E.E. Transactions, vol. 81, Part I, January 1963, pages 429–33; R. E. Morgan, A New Magnetic-Controlled Rectifier Power Amplifier With a Saturable Reactor Controlling on Time, A.I.E.E. Transactions, vol. 80, Part I, May 1961, pages 152–55; and R. Dunn and J. Wood, A Simple Pulse Generator Using Silicon Four-Layer Devices, Electronic Engineering, July 1963, pages 470–471.

FIG. 1, however, shows an automatic reset circuit in which the electromotive force generated in the additional reset winding R charges the capacitor 14 to the polarity indicated as the current through the primary winding P switches the core of the transformer into positive saturation. Promptly after the core has switched, the generated electromotive force in winding R rapidly drops to zero permitting the capacitor 14 to discharge through switch SW–1 and winding R with a current greater than that coming from sources 16 and 17 thereby resulting in a net reverse current through switch SW–1. This net reverse current quickly opens switch SW–1. Bias source BS now switches the core of transformer T–1 back to negative saturation where it remains until the traveling wave tube beam is again to be turned on.

When the traveling wave tube beam is to be again turned on, the initial state is first reestablished by closing switch SW–1 to switch the transformer into positive saturation. Capacitor 14 then promptly discharges to reopen this switch in the manner described above, thereby re-establishing the initial circuit conditions with the modulating anode of the traveling wave tube charged negative to the cathode and helix. As previously described, this negative bias holds the traveling wave tube beam off and since the switches are now both open and the saturable transformer is in its positive saturable state, the circuit will turn the beam on providing the control pulse is applied to terminals 12 to close switch SW–2 before the bias source BS can switch the core back to negative saturation. Refer again to FIG. 2 where the sequence of operations just described is illustrated. Preparatory to turning the beam on switch SW–1 must be closed as represented by the pulse 23. Then before the bias source can reverse the transformer saturation, switch SW–2 is closed to turn the beam on as represented by waveform 21. The beam is subsequently turned off by again closing switch SW–1 as represented by pulse 22 which turns the beam off and opens all switches and diodes.

What is claimed is:

1. A modulator for a traveling wave tube having a beam forming and control means including cathode, modulating anode and helix electrodes, a saturable transformer having a plurality of windings, means charging said modulating anode negative with respect to said cathode to cut off the traveling wave tube beam, means including a first switching means coupling a first one of said windings between said anode and cathode electrodes to start a ringing current therebetween upon closure of said first switching means which reverses the charge between said electrodes to turn on said beam, an input circuit connected to said first switching means for receiving a modulating pulse to close said first switching means, a first diode means connected across said first one of said windings to limit the reversed charge between said anode and cathode electrodes and to damp said ringing current, a source of direct voltage connected between said cathode and helix electrodes, means including a second switching means coupling said direct voltage source to a second winding on said transformer for switching said transformer to an opposite saturable state and thereby generate a voltage in said first winding to start a second ringing current between said first winding and said anode and cathode electrodes which returns a negative beam cutoff charge on said anode, an input circuit connected to said second switching means for receiving a modulating pulse to close said second switching means, and a second diode means connected between said anode and cathode electrodes to limit said beam cutoff charge and to damp said second ringing current.

2. The combination of claim 1 wherein said second switching means comprises a silicon controlled rectifier with a means for automatically reopening said switch comprising a third winding on said transformer and a capacitor connected in series across said second switching means.

3. The combination of claim 1 wherein both said first and second switching means comprise silicon controlled rectifiers.

4. A modulator for a traveling wave tube having cathode, modulating anode and helix electrodes, a saturable transformer having a plurality of windings, a first switching means connecting one of said windings between said modulating anode and helix electrodes, an input circuit connected to said first switching means for receiving a modulating pulse to close said first switching means, a first Zener diode and a rectifier diode connected in opposed polarity relationship across said one transformer winding, a second Zener diode and a second rectifier diode connected in opposed polarity relationship between said modulating anode and cathode electrodes, a source of direct voltage connected between said cathode and helix electrodes, a second switching means connecting a second transformer winding across said source of direct voltage, and an input circuit connected to said second switching means for receiving a modulating pulse to close said second switching means.

5. A modulator for a traveling wave tube having cathode, modulating anode and helix electrodes, a saturable transformer having a plurality of windings, a first switching means coupling one of said windings between said modulating anode and at least one other of said electrodes of said traveling wave tube to start a ringing current between said electrodes and said winding upon closure of said switching means and to turn on the beam of said traveling wave tube, an input circuit connected to said first switching means for receiving a modulating pulse to close said first switching means, a first Zener diode and a rectifier diode connected in opposed polarity relationship across said one transformer winding to limit the voltage across said winding and to damp said ringing current, a source of direct voltage connected between said cathode and helix electrodes, a second switching means coupling a second transformer winding across said source of direct voltage to reverse the saturation condition of said transformer and to start a second ringing current between said electrodes and said one transformer winding to turn off the traveling wave tube beam, an input circuit connected to said second switching means for receiving a modulating pulse to close said second switching means, and a second Zener diode and a second rectifier diode connected in opposed polarity relationship between said modulating anode and cathode electrodes to limit and damp the voltage of said second ringing current.

References Cited

UNITED STATES PATENTS 3,259,855 7/1966 Massey ---------------- 332—7

OTHER REFERENCES

Reise: Bell Lab. Records, "Hard Tube Pulses for Radar," pp. 153–156, April 1956.

Swanson: Microwave Journal, "Modulator Techniques for Gridded Klystrons and Traveling Wave Tubes," pp. 29–33, July 1959.

ALFRED L. BRODY, *Primary Examiner*.